(12) United States Patent
Reisinger

(10) Patent No.: US 6,651,793 B2
(45) Date of Patent: Nov. 25, 2003

(54) POWER-SPLIT TRANSMISSION WITH A CONTROLLABLE FRICTION CLUTCH

(75) Inventor: Karl Reisinger, Graz (AT)

(73) Assignee: Steyr Powertrain AG & CO AG, Lannach (AT)

( * ) Notice: Subject to any disclaimer, the term of this patent is extended or adjusted under 35 U.S.C. 154(b) by 0 days.

(21) Appl. No.: 10/211,149

(22) Filed: Jul. 31, 2002

(65) Prior Publication Data

US 2003/0029690 A1 Feb. 13, 2003

(30) Foreign Application Priority Data

Jul. 31, 2001 (AT) ........................................ 604/2001 U

(51) Int. Cl.⁷ ............................................. B60K 17/34
(52) U.S. Cl. ..................... 192/35; 192/54.52; 192/84.6; 192/99 A; 180/233
(58) Field of Search ................................ 192/35, 99 R, 192/99 A, 84.7, 84.6, 54.52; 180/233

(56) References Cited

U.S. PATENT DOCUMENTS

| | | | | |
|---|---|---|---|---|
| 5,423,235 A | * | 6/1995 | Botterill et al. | ........ 74/665 GA |
| 5,718,653 A | * | 2/1998 | Showalter | .................... 475/230 |
| 5,771,477 A | * | 6/1998 | Showalter et al. | ............ 701/51 |
| 5,915,513 A | * | 6/1999 | Isley et al. | ..................... 192/35 |
| 5,927,426 A | * | 7/1999 | Hall et al. | ................... 180/249 |
| 5,943,911 A | * | 8/1999 | Beckerman | ................... 74/333 |
| 6,101,897 A | * | 8/2000 | Showalter | .............. 74/665 GE |
| 6,568,519 B2 | * | 5/2003 | Lovatt | ........................ 192/56.6 |
| 6,579,208 B2 | * | 6/2003 | Oliveira et al. | ............. 477/124 |

* cited by examiner

Primary Examiner—Saul Rodriguez
(74) Attorney, Agent, or Firm—Bachman & LaPointe, P.C.

(57) ABSTRACT

In a power-split transmission for driving a first and a second axle of a motor vehicle, in the case of which transmission are located a first and a second output shaft (3, 4) and a friction clutch (12), the latter is intended to transmit a controllable torque. For this purpose, (a) for the action of pressure upon the pressure plate (29), there are provided two rotationally uncoupled ring parts (31, 32) which are coaxial to the friction clutch and at least one of which possesses ramps rising in the circumferential direction, (b) the two ring parts (31, 32) are supported in the axial direction and each possess a ramp lever (35, 36), the free end (37, 38) of which cooperates with a control unit (11) which moves the ramp levers in opposite directions, and (c) the control unit (11) having a rotatable control disk (40) with two slots, and the drive means being an electric geared motor.

12 Claims, 5 Drawing Sheets

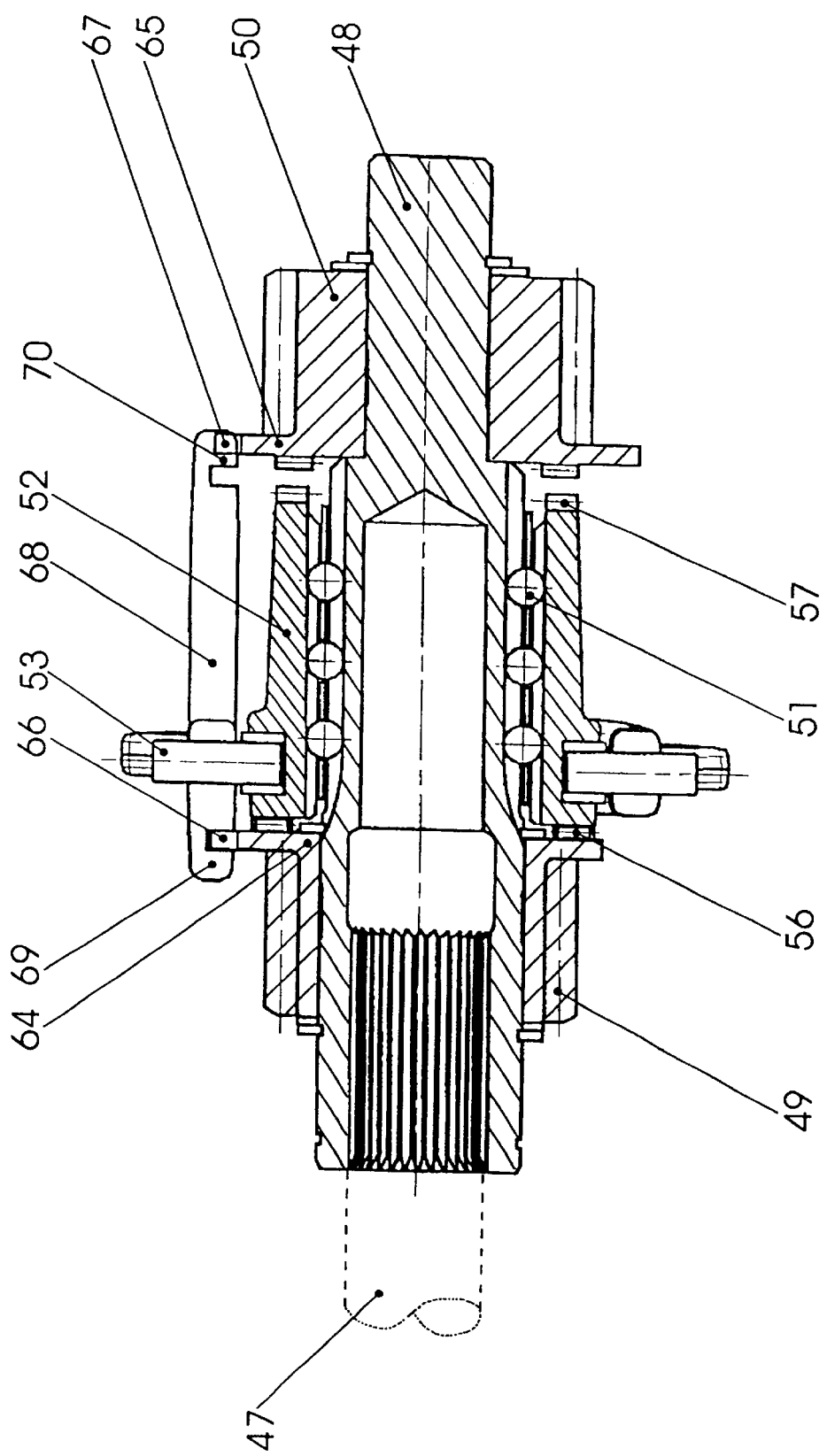

POWER-SPLIT TRANSMISSION WITH A CONTROLLABLE FRICTION CLUTCH

BACKGROUND OF THE INVENTION

The invention relates to a power-split transmission for driving a first and a second axle of a motor vehicle, in the case of which transmission are located a first and a second output shaft and a controllable friction clutch, the torque transmitted by the friction clutch being capable of being varied by the action of pressure upon a pressure plate.

Power-split transmissions are used in various configurations. They can be installed with or without a central differential, with a differential lock or a connectable drive of the second driven axle, with or without a reduction stage, and, finally, also longitudinally or transversely. The use of a friction clutch also makes it possible, in addition to smooth engagement, to have continuous control of the torque transmitted by the latter.

For engagement, the clutch is acted upon, this requiring considerable actuating forces. These forces are normally applied hydraulically. However, hydraulic actuation is too slow to release the clutch in the short shift time necessary for electronic slip limitation systems (ESB, ABS, etc.). Moreover, passenger cars do not possess a hydraulic system. Nonhydraulic actuation, for example by electrical means and mechanical transmission, have hitherto come up against the problem of the high actuating forces which have had to be introduced into the case via bearings.

Also, where electrical actuation is concerned, there is always the question of operating reliability in the event of failure of the electrical means. The system must be intrinsically safe, that is to say the more reliable switching state must always be assumed if the electrics fail. In power-split transmissions with a reduction stage (off-highway gear stage), in addition to the friction clutch, there is, furthermore, the problem also of activating the latter in coordination with the differential lock or axle-drive connection.

The object of the invention is, therefore, to improve power-split transmissions to the effect that they can be controlled quickly, in order to achieve the short shift times necessary for RSB, and to the effect that no actuating forces have to be introduced into the case, said power-split transmissions being intrinsically safe in functional terms, at a minimal outlay in terms of construction.

SUMMARY OF THE INVENTION

The foregoing object is achieved, according to the invention wherein a) for the action of pressure upon the pressure plate, there are provided two rotationally uncoupled ring parts which are coaxial to the friction clutch and at least one of which possesses ramps rising in the circumferential direction, b) the two ring parts are supported in the axial direction and each possess a ramp lever, the free end of which cooperates with the control unit which possesses electrical drive means and which moves the ramp levers in opposite directions, c) the control unit having a rotatable control disk with two slots, and the drive means being an electric geared motor.

The rings rotationally uncoupled from one another and from the shaft carrying them are rotatable relative to one another by means of their ramp levers, and, because of the oppositely directed movement of these, no actuating forces have to be diverted to the case. The rising ramps in the ring/rings require only very low relative rotation for high actuating forces and, with rolling bodies being interposed, are frictionless, so that very short shift times are achieved in cooperation with the electrical actuation. The electric geared motor has a very small build, if the motor rotational speed and transmission ratio are appropriately selected, and can be controlled quickly by known means. The construction of the two slots on a rotatable control disk ensures the oppositely directed movement under all circumstances.

At the same time, a particularly space-saving form of construction is obtained when the axis of rotation of the control disk is oriented approximately in the direction of movement of the free ends of the two ramp levers. Moreover, it is thus possible also to actuate a reduction stage, present if appropriate, from the same geared motor and to control said reduction stage in coordination and in an intrinsically safe manner at the lowest possible outlay.

In an embodiment of the power-split transmission with a reduction stage which is capable of being shifted by axial displacement of one of its elements, there is provision according to the invention for a) the control unit to consist of a carrier shaft driven by the geared motor, of a changeover sleeve connected fixedly in terms of rotation to said carrier shaft, but displaceable, of the control disk mounted rotatably on the carrier shaft and of a control pinion, likewise mounted rotatably on said control disk, for the changeover of the reduction stage, b) the changeover sleeve being displaceable by means of an electromagnet and possessing first and second coupling teeth, by means of which said changeover sleeve selectively makes the drive connection to the control disk or to the control pinion.

By means of this refinement, both the friction clutch and the reduction stage can selectively be activated in an intrinsically safe manner by means of a single control unit and a single motor. Moreover, costs and construction space are saved. Furthermore, it is ensured that the two are not switched simultaneously and that the friction clutch is released in the event of failure of the control unit.

In an advantageous development, the electromagnet is a three-position magnet which displaces the changeover sleeve by means of a shift fork, and the changeover sleeve possesses shift teeth with a push-away meshing angle. As a result, in the event of failure of the electromagnet, the clutch is opened automatically, with the effect of intrinsically safe actuation.

In a particularly advantageous design of the power-split transmission with a differential lockable by means of the friction clutch and with a reduction stage, there being in the differential case a first member driven by an input shaft and in each case a driven member for driving a first and a second output shaft, the differential case having mounted in it, in addition to the balancing wheels, planet wheels of the reduction stage which mesh, on the one hand, with a driving sun wheel and, on the other hand, with a ring gear, the ring gear being displaceable in the axial direction. The differential and the reduction stage are thereby combined in structural terms, with the result that the common control of the two is also simplified.

In an advantageous development of the control of the friction clutch, a detaining disk with at least one detaining recess is connected fixedly in each case to the hub of the control disk and to the control pinion, said detaining recess cooperating with a detaining member coupled to the changeover sleeve, which detaining member possesses a detaining tooth on each side, so that the detaining tooth meshes into the detaining recess of the detaining disk when the control disk is uncoupled, and so that the detaining tooth meshes into the detaining recess of the detaining disk when the control pinion is uncoupled. This gives rise, without any external action, to the inherent safety that the driven element uncoupled in each case is detained and that it can be uncoupled only after the end of a shift meshing.

In a modified embodiment of the control, a) the rotatable control disk has a first clutch half of a claw clutch and is rotatable and displaceable on a carrier shaft driven by the electric geared motor, b) the second clutch half of the claw clutch is mounted fixedly on the carrier shaft, and c) a forked lever mounted pivotably in the case engages on the control disk.

The control disk is therefore displaced axially for the engagement of the claw clutch. However, because of the oppositely directed movement of the two ramp levers, the displacement of the control disk does not have an effect on the functioning of said claw clutch. Thus, a particularly simple claw clutch with only a few components is provided. The forked lever can cooperate with an electromagnet and thus, when current is applied, can engage the claw clutch counter to the force of a spring and, if appropriate, also retain said claw clutch, so that, when current is not applied, the claw clutch is disengaged by the spring, the claw clutch having a deflector toothing (11).

In a developed variant, the carrier shaft possesses a radially projecting coupling bolt which cooperates with a control face of the control disk in such a way that, during rotation of the carrier shaft, the control disk is intermeshed by means of its first clutch half with the second clutch half, and the electromagnet is designed as a magnetic clamp. The engagement of the claw clutch is thus initiated automatically when the geared motor is started up, and the claw clutch is retained by the holding magnet as long as current is applied to said claw clutch. The design as a magnetic clamp has the advantage that only a very low magnetizing current is necessary.

BRIEF DESCRIPTION OF THE DRAWINGS

The invention is described and explained below with reference to figures of various exemplary embodiments. In the figures:

FIG. 4 illustrates an alternative detail to FIG. 3, somewhat enlarged.

DETAILED DESCRIPTION

Figure 1:
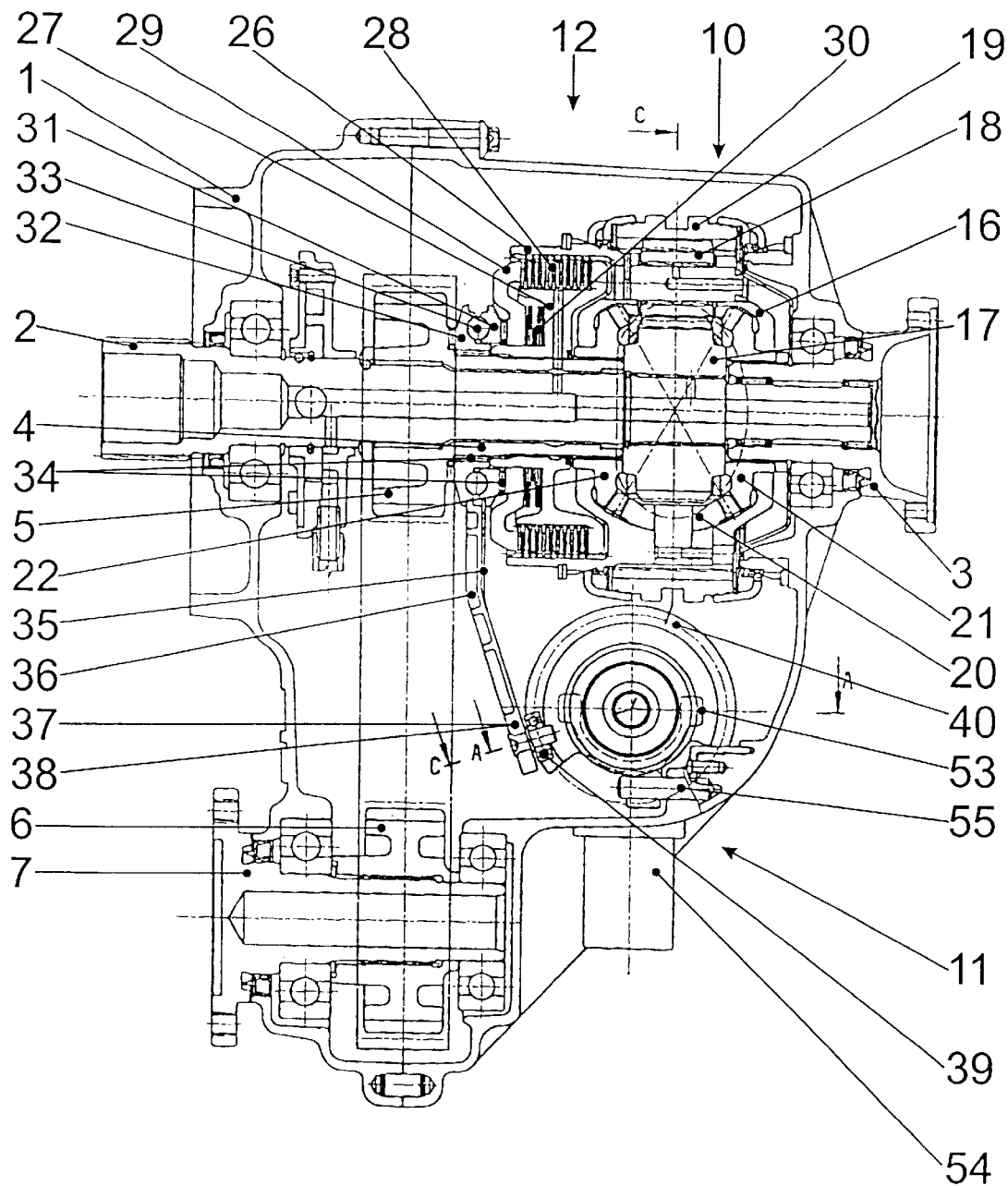
FIG. 1 illustrates a vertical section through an exemplary embodiment of a power-split transmission according to the invention with the friction clutch according to the invention.

In FIG. 1, the case of a power-split transmission is designated as a whole by 1, an input shaft coming from the drive unit, not illustrated, of the vehicle by 2, a first output shaft drive-connected to the rear axle by 3 and a second output shaft drive-connected to the front axle, likewise not illustrated, by 4. The second output shaft 4 drives by means of a first toothed-belt wheel 5 a second toothed-belt wheel 6, the axis of which is offset laterally and/or downward with respect to the input shaft 2 and which is seated on a driven shaft 7 for the drive of the front axle.

For distributing the torque to the two output shafts 3, 4, a differential mechanism, designated summarily by 10, is provided. Furthermore, a control unit 11 under the differential mechanism 10 and a locking clutch 12 for the controllable locking of the differential mechanism 10 are provided. In the exemplary embodiment shown, the locking clutch is combined in structural terms with the differential mechanism 10. It could, however, also be arranged separately, even anywhere else in the power-split transmission or in the drive train. The differential mechanism 10 itself may also be designed very differently within the scope of the invention.

Figure 2:
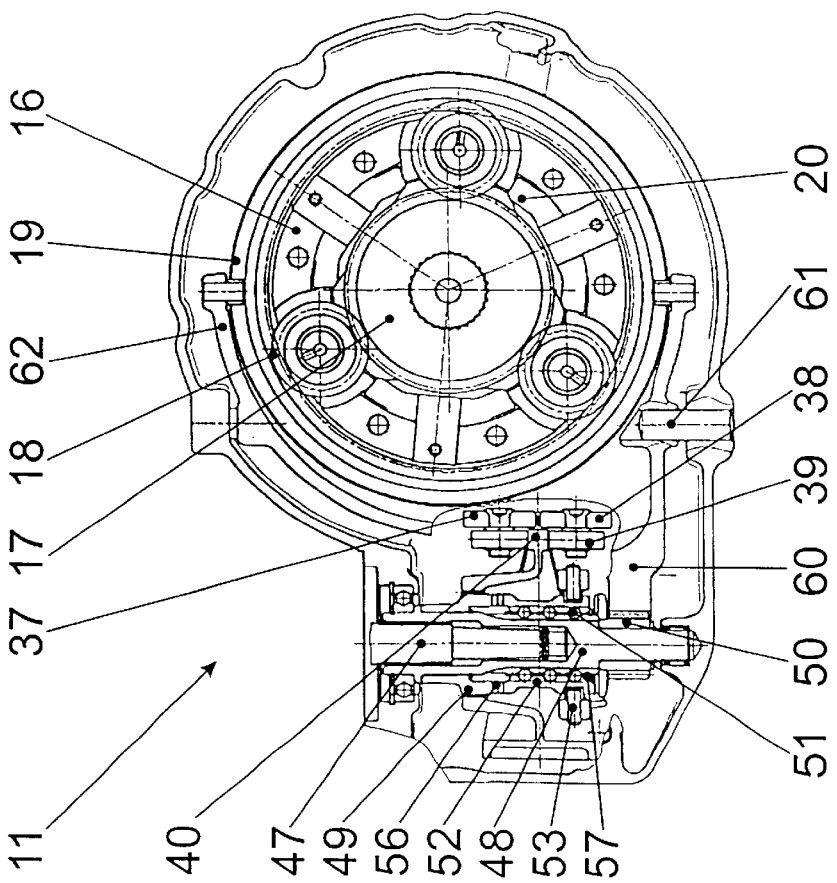
FIG. 2 illustrates a section according to CC in FIG. 1.

A particular illustrative version of the differential mechanism can be seen in FIG. 1 and FIG. 2. Within the differential case 16, which here serves at the same time as a planet carrier, are located a sun wheel 17 connected fixedly in terms of rotation to the input shaft 2, planet wheels 18 of the reduction stage which are mounted rotatably in the differential case 16 and also first balancing wheels 21 and second balancing wheels 22. The first (21) are connected fixedly in terms of rotation to the first output shaft 3 and the second (22) are connected fixedly in terms of rotation to the second output shaft 4. The differential case 16 is surrounded by a ring gear 19 which is axially displaceable and which in the off-highway gear is connected fixedly in terms of rotation to the differential case 16. This particular embodiment of the differential mechanism 10 is the subject of Austrian patent 405 157 and is described in more detail there in terms of its form of construction and its functioning.

FIG. 1 also illustrates the locking clutch 12 in detail. It consists of a clutch case 26 which is fixedly connected to or here is even in one piece with the differential case 16, of a clutch inner part 27 which is connected fixedly in terms of rotation to the second output shaft 12, of a lamellar assembly 28 and of a pressure plate 29 which is acted upon in the opening direction by return springs 30. Between the pressure plate 29 and the second output shaft, here, in particular, the first toothed-belt wheel 5 seated on the latter, are arranged two rings 31, 32. Balls 33 are located in corresponding circumferential grooves between these rings 31, 32. These circumferential grooves are designed in one of the rings, or in both, as ramps, so that, during relative rotation of the two rings in relation to one another, an axial force is generated by the ball running on the ramp. The two rings 31, 32 are completely stationary when the clutch is not actuated. For rotational uncoupling, therefore, the two rings 31, 32 are axially supported and mounted on needle bearings 34.

The first ring 31 possesses a first ramp lever 35 and the second ring 32 a second ramp lever (36), said ramp levers being fixedly connected at one end to the ring, projecting downward and possessing at their free ends 37, 38 rollers 39. Between the two rollers 39 is located a rotatable control disk 40. During rotation of this control disk, the rollers 39 are moved apart from one another and the rings 31, 32 are rotated relative to one another via the ramp levers 35, 36 moved in a scissor-like manner.

Figure 3:
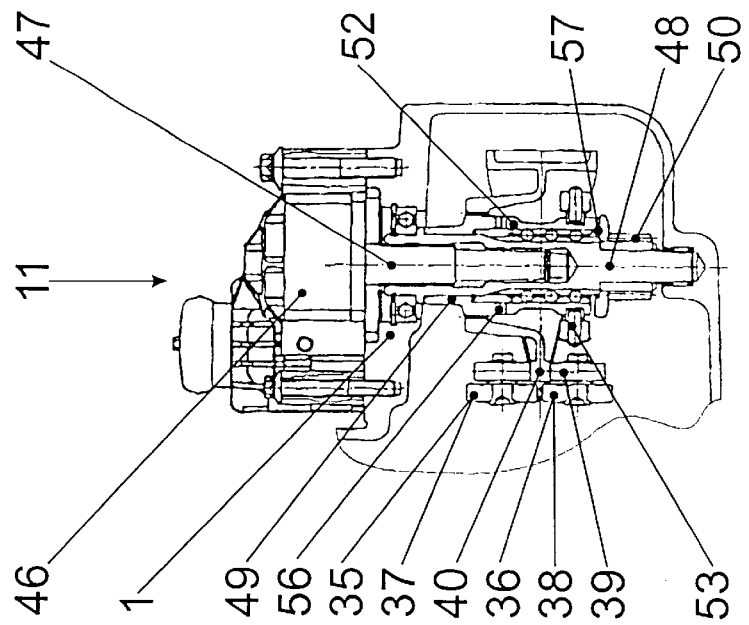
FIG. 3 illustrates a section according to AA in FIG. 1.

In FIG. 2 and FIG. 3, 46 designates an electric geared motor, the motor output shaft 47 of which rotates with a corresponding reduction when the motor is running. Connected fixedly in terms of rotation to said motor output shaft is a carrier shaft 48 which is slipped onto the latter in a sleeve-like manner and which is mounted on both sides in the case 1. The hub 49 of the control disk 40 and a pinion 50 are mounted rotatably on the carrier shaft 48. A changeover sleeve 52 is mounted fixedly in terms of rotation, but displaceably in the longitudinal direction, on the carrier shaft 48 between the hub 49 and the pinion 50 by means of a longitudinal ball guide 51. The changeover sleeve 52 is displaced by means of a changeover fork 53 which is actuated by a changeover magnet 54 (FIG. 1) via a lever mounted in a changeover-fork axle 55 (FIG. 1). The changeover sleeve 52 has at its two axial ends first shift teeth 56 for the rotationally fixed connection to the hub 49 and second shift teeth 57 for the rotationally fixed connection to the pinion 50. The shift teeth 56, 57 are coupling teeth with a push-away meshing angle.

The pinion 50 meshes with a toothed quadrant 60 which is part of a shift fork 62 which is pivotable in the case about an axis 61 and by means of which the ring gear 19 is displaced for changeover into the off-highway gear. By means of this displaceable changeover sleeve, the same geared motor 46 can serve selectively either for locking the differential or for the changeover into the off-highway gear, but never both at the same time. If the changeover magnet 54 fails, the changeover sleeve 52, when intermeshed precisely with the hub 49 or the pinion 50, is pushed away into the uncoupled position by the push-away meshing angle of the shift teeth 56, 57 and of their counterteeth. In this way, the differential lock is released reliably if the magnet fails. If, starting from the neutral position of the changeover sleeve 52, the differential is either locked or is shifted into the off-highway gear, said changeover sleeve is connected fixedly in terms of rotation either to the hub 49 or to the pinion 50 by current being applied to the shift magnet 54 designed as a three-position magnet. The corresponding adjustment is then carried out by the motor being switched on.

FIG. 4 shows a modified embodiment of the control unit 11. On the one hand, the hub 49 of the control disk 40 and, on the other hand, the control pinion 50 are mounted rotatably on the carrier shaft 48. The hub 49 is fixedly connected to or is in one piece with a first detaining disk 64 and the control pinion 50 with a second detaining disk 65. The detaining disks 64, 65 have on their outer circumference at least one detaining recess 66, 67 which cooperates with a detaining member 68 coupled to the changeover sleeve 52. Said detaining member can be in one piece with or be connected to the changeover fork 53 in such a way that it follows the movement of the latter in the longitudinal direction.

The detaining member 68 possesses, on the side of the hub 49, a first detaining tooth 69 engaging over the detaining disk 64 and, on the side of the control pinion 50, a second detaining tooth 70 engaging over the detaining disk 65. The first detaining tooth 69 does not mesh into the first detaining recess 66 when the hub 49 is coupled to the changeover sleeve 52, and the detaining disk 64 can rotate, unimpeded. In this position of the detaining member 68, the control pinion 50 is uncoupled and the second detaining tooth 70 meshes into the second detaining recess 67, so that the control pinion 50 is detained.

If, then, after the control disk 40 has ended its actuating movement, there is to be a change to adjustment by means of the control pinion 50, the changeover fork 53 is displaced to the right in the figure. When the control disk 40 has properly ended its actuating movement, the detaining tooth 69 can mesh into the detaining recess 66 and thus detains the control disk 40. At the same time, on the other side, the detaining tooth 70 is pushed to the right out of the detaining recess 67 and the changeover sleeve 52 meshes by means of its coupling toothing 57 into the associated coupling toothing of the control pinion 50. The latter is thus unlocked and coupled.

Figure 5:
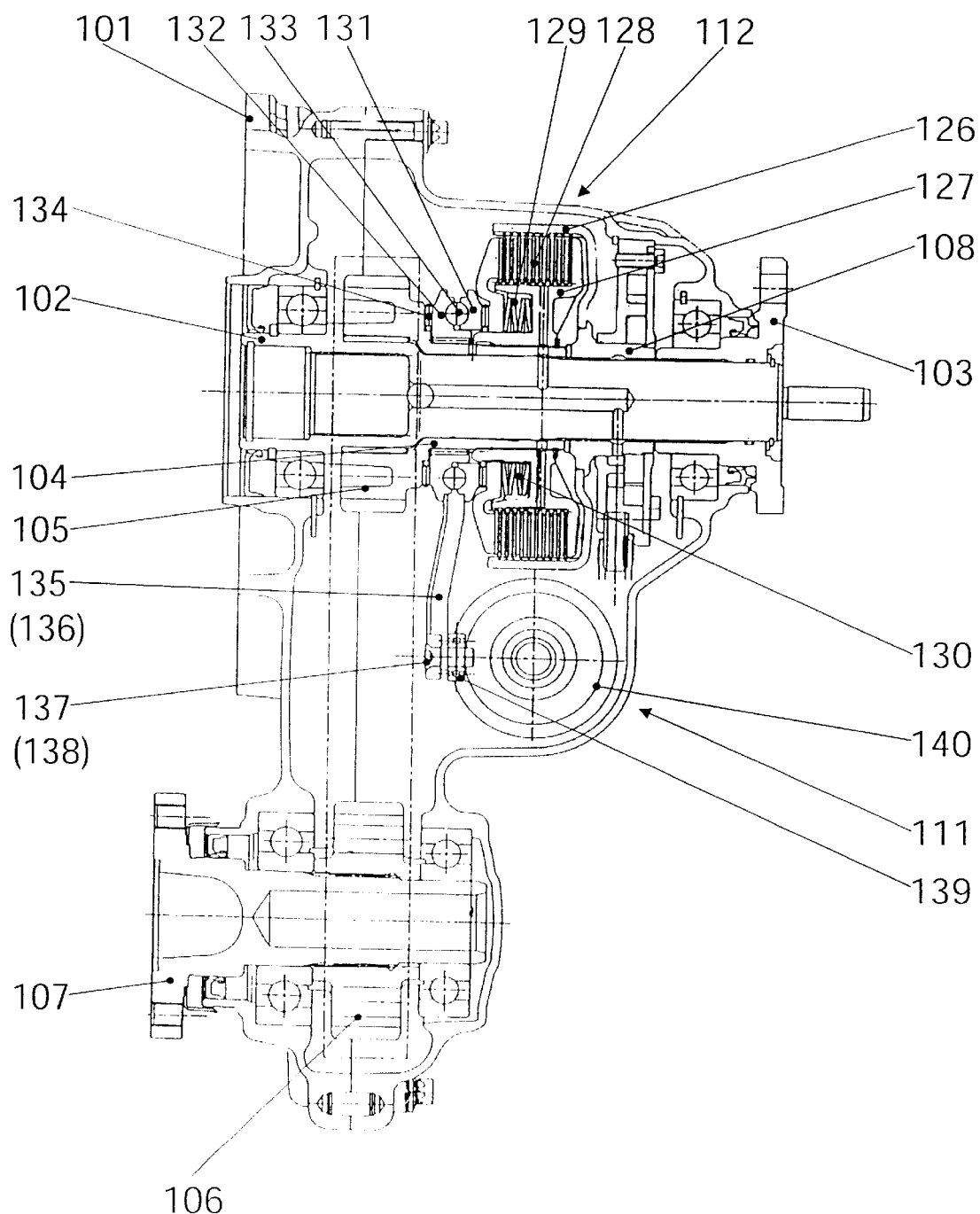
FIG. 5 illustrates a vertical section through another exemplary embodiment of a power-split transmission with the friction clutch according to the invention.

In the version of FIG. 5, identical parts are designated by the same reference symbols as in FIGS. 1 and 2, plus 100. It differs in that there is no reduction stage and no differential mechanism. The torque for the second output shaft is branched off from the first output shaft 103 by means of the controllable friction clutch 112. The clutch case 126 is connected fixedly to the input shaft 102 by means of a hub 108. The clutch is otherwise the same as in FIGS. 1 and 2; the rings 131, 132 and the ramp levers 135, 136 are adopted, unchanged. Since the reduction stage is omitted, the control unit 11 is simpler and is illustrated in a further variant in FIG. 6.

Figure 6:
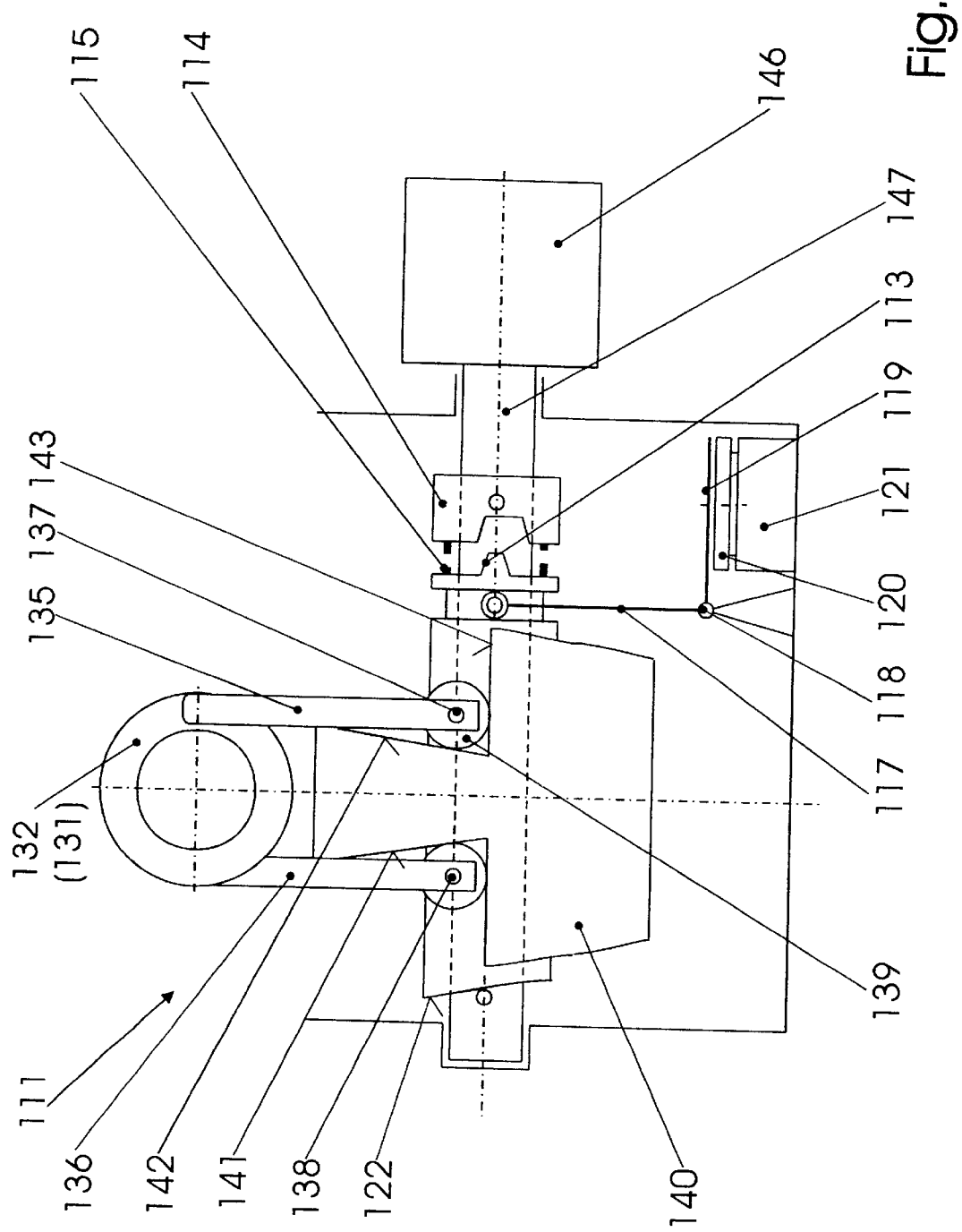
FIG. 6 illustrates a section according to VI—VI in FIG. 5.

The reference symbols, increased by 100, are likewise entered in FIG. 6 which thus shows the control unit 111. The control disk 140, together with the two slots 141, 142 which extend over the entire circumference and are interrupted by a stop face 143, itself forms the first clutch half 113 of a claw clutch, the claw flanks of which are inclined in such a way that a deflector action occurs.

The control disk 140 could also be connected fixedly to the first clutch half 113. At all events, here, it is guided on the carrier shaft 147 rotatably and axially displaceably. The corresponding second clutch half 114 is mounted fixedly on the carrier shaft 147. An annular groove 116, into which a forked lever 117 engages, is formed on the control disk 140 or on the first clutch half 113. Said forked lever forms with one arm 119 a two-armed lever pivotable in the bearing 118 fixed to the case.

A conventional electromagnet can act on this two-armed lever and, when current is applied, engages the claw clutch via the forked lever 117. Additionally or alternatively, the arm 119 has mounted on it a clamping plate 120 which cooperates with a magnetic clamp 121. The latter causes the claw clutch to be kept engaged by means of a low required current and is opened by the spring 115 acting between the two clutch halves 113, 114 and by the deflector toothing of the clutch claws, as soon as current no longer flows, for whatever reason.

If only the clamping plate 120 and magnetic clamp 121 are provided, the displacement of the control disk 140 and of the first clutch half 113 may also take place by means of a further control cam 122 on that edge of the control disk 140 which faces away from the first clutch half 113, said control cam cooperating with a coupling pin 123 mounted fixedly in the carrier shaft 147. When the geared motor is switched on, that is to say the carrier shaft 147 begins to rotate, the control disk 140 is pushed to the right (in FIG. 6) by the coupling pin and is then held by the magnetic clamp. The fact that both ramp levers are pivoted during the displacement of the control disk 140 is irrelevant, since, of course, only their relative rotation in relation to one another is important.

What is claimed is:

1. A power-split transmission for driving a first and a second axle of a motor vehicle, in the case of which transmission are located a first and a second output shaft (3, 4; 103, 104) and a controllable friction clutch (12; 112), the torque transmitted by the friction clutch being capable of being varied by the action of pressure upon a pressure plate (29; 129), wherein, a) for the action of pressure upon the pressure plate (29; 129), there are provided two rotationally uncoupled ring parts (31, 32; 131, 132) which are coaxial to the friction clutch (12; 112) and at least one of which possesses ramps rising in the circumferential direction, b) the two ring parts (31, 32; 131, 132) are supported in the axial direction and each possess a ramp lever (35, 36; 135, 136), the free end (37, 38; 137, 138) of which cooperates with a control unit (11; 111) which possesses electrical drive means (46; 54) and which moves the ramp levers (35, 36; 135, 136) in opposite directions, c) the control unit (11; 111) having a rotatable control disk (40; 140) with two slots (141, 142), and the drive means (46; 54) being an electric geared motor.

2. The power-split transmission as claimed in claim 1, wherein the axis of rotation of a control disk (40; 140) is oriented in the direction of movement of the free ends (37, 38; 137, 138) of the two ramp levers (35, 36; 135, 136).

3. The power-split transmission as claimed in claim 1 with a reduction stage which is capable of being shifted by axial displacement of one of its elements (19), wherein a) the control unit (11) consists of a carrier shaft (48) driven by the geared motor (46), of a changeover sleeve (52) connected fixedly in terms of rotation to said carrier shaft, but displaceable, of the control disk (40) mounted rotatably on the carrier shaft (48) and of a control pinion (50), likewise mounted rotatably on said carrier shaft, for the displacement of one of the elements (19) of the reduction stage, b) the changeover sleeve being displaceable by means of an electromagnet (54) and possessing first and second coupling teeth (56, 57), by means of which said changeover sleeve selectively makes the drive connection to the control disk (40) or to the control pinion (50).

4. The power-split transmission as claimed in claim 3, wherein the electromagnet (54) is a three-position magnet which displaces the changeover sleeve (52) by means of a shift fork (53).

5. The power-split transmission as claimed in claim 4, wherein the changeover sleeve (52) possesses coupling teeth (56, 57) with a push-away meshing angle.

6. The power-split transmission as claimed in claim 3, with a differential mechanism (10) consisting of a first member (16) driven by an input shaft and in each case of a driven member (21, 22) for driving a first and a second output shaft (3, 4), wherein the differential case (16) has mounted in it, in addition to the balancing wheels (20), planet wheels (18) of the reduction stage which mesh, on the one hand, with a driving sun wheel (17) and, on the other hand, with a ring gear (19), the ring gear being displaceable in the axial direction.

7. The power-split transmission as claimed in claim 3, wherein a detaining disk (64, 65) with at least one detaining recess (66, 67) is connected fixedly in each case to the hub (49) of the control disk (40) and to the control pinion (50), said detaining recess cooperating with a detaining member (68) which is coupled to the changeover sleeve (52) and which possesses a detaining tooth (69, 70) on each side, so that the detaining tooth (69) meshes into the detaining recess (66) of the detaining disk (64) when the control disk (40) is uncoupled, and so that the detaining tooth (70) meshes into the detaining recess (67) when the control pinion (50) is uncoupled.

8. The power-split transmission as claimed in claim 1, wherein a) the rotatable control disk (140) has a first clutch half (113) of a claw clutch (113, 114) and is mounted rotatably and displaceably on a carrier shaft (147) driven by the electric geared motor (146), b) the second clutch half (114) of the claw clutch (112) is mounted fixedly on the carrier shaft (147), and c) a forked lever (117) mounted pivotably in the case engages on the control disk (140).

9. The power-split transmission as claimed in claim 8, wherein the forked lever (117) cooperates with an electromagnet (121).

10. The power-split transmission as claimed in claim 9, wherein, when current is applied, the electromagnet (121) engages the claw clutch (113, 114) counter to the force of a spring (115).

11. The power-split transmission as claimed in claim 10, wherein, when current is applied, the electromagnet (121) keeps the claw clutch (113, 114) engaged and, when current is not applied, the claw clutch (113, 114) is disengaged by the spring (115), the clutch halves (113, 114) having a deflector toothing.

12. The power-split transmission as claimed in claim 9, wherein the carrier shaft (147) possesses a radially projecting coupling bolt (123) which cooperates with a control face (122) of the control disk (140) in such a way that, during rotation of the carrier shaft (147), the control disk (140) is intermeshed by means of its first clutch half (113) with the second clutch half (114), and wherein the electromagnet (121) is designed as a magnetic clamp.

\* \* \* \* \*